US012261383B2

(12) United States Patent
Omodachi

(10) Patent No.: US 12,261,383 B2
(45) Date of Patent: Mar. 25, 2025

(54) SOCKET CONNECTOR

(71) Applicant: Japan Aviation Electronics Industry, Ltd., Tokyo (JP)

(72) Inventor: Takashi Omodachi, Tokyo (JP)

(73) Assignee: Japan Aviation Electronics Industry, Ltd., Tokyo (JP)

( * ) Notice: Subject to any disclaimer, the term of this patent is extended or adjusted under 35 U.S.C. 154(b) by 294 days.

(21) Appl. No.: 17/743,552

(22) Filed: May 13, 2022

(65) Prior Publication Data

US 2023/0062405 A1 Mar. 2, 2023

(30) Foreign Application Priority Data

Aug. 31, 2021 (JP) ................................ 2021-141031
Sep. 17, 2021 (JP) ................................ 2021-152249

(51) Int. Cl.
*H01R 12/71* (2011.01)
*H01R 12/70* (2011.01)
(Continued)

(52) U.S. Cl.
CPC ......... *H01R 13/24* (2013.01); *H01R 12/7005* (2013.01); *H01R 12/716* (2013.01); (Continued)

(58) Field of Classification Search
CPC ...... H01R 12/71; H01R 12/714; H01R 13/64; H01R 13/6485; H01R 13/24; H01R 12/52
See application file for complete search history.

(56) References Cited

U.S. PATENT DOCUMENTS

D774,463 S * 12/2016 Omodachi .................. D13/147
2015/0270641 A1 11/2015 Omodachi et al.
(Continued)

FOREIGN PATENT DOCUMENTS

CN 211605453 U 9/2020
CN 112542713 A 3/2021
(Continued)

OTHER PUBLICATIONS

Korean Office Action in counterpart Korean Application No. 2022-0081271 issued on Sep. 26, 2023, with English Translation.
(Continued)

*Primary Examiner* — Tulsidas C Patel
*Assistant Examiner* — Carlos E Lopez-Pagan
(74) *Attorney, Agent, or Firm* — Renner, Otto, Boisselle & Sklar, LLP

(57) ABSTRACT

A socket connector includes: a socket housing; a plurality of contacts arranged in the housing; and a protective metal fitting configured to protect an island-like end part. The protective metal fitting includes: an upper-surface protective part covering an upper surface of the island-like end part; two crosswise surface protective parts extending downward from both ends of the upper-surface protective part in a width direction, and opposed to two crosswise side surfaces, respectively, of the island-like end part that face in the width direction; and two curling parts extending from lower ends of the two crosswise surface protective parts, respectively, in such a manner that the two curling parts get closer to each other as they extend.

6 Claims, 20 Drawing Sheets

(51) Int. Cl.
*H01R 13/24* (2006.01)
*H01R 13/405* (2006.01)
*H01R 13/502* (2006.01)

(52) U.S. Cl.
CPC ......... *H01R 13/405* (2013.01); *H01R 13/502* (2013.01); *H01R 13/5025* (2013.01)

(56) References Cited

U.S. PATENT DOCUMENTS

| | | | | |
|---|---|---|---|---|
| 2015/0380845 | A1 | 12/2015 | Goto et al. | |
| 2018/0331444 | A1* | 11/2018 | Ono ..................... | H01R 13/504 |
| 2019/0148855 | A1* | 5/2019 | Miyazaki ........... | H01R 12/7029 439/345 |
| 2019/0181572 | A1 | 6/2019 | Ono | |
| 2020/0144754 | A1 | 5/2020 | Ishida | |
| 2020/0235505 | A1 | 7/2020 | Ono | |
| 2020/0395704 | A1 | 12/2020 | Hosoda | |
| 2023/0065545 | A1 | 3/2023 | Meng et al. | |

FOREIGN PATENT DOCUMENTS

| | | | |
|---|---|---|---|
| CN | 112670729 | A | 4/2021 |
| CN | 113131242 | A | 7/2021 |
| JP | 2020-077490 | A | 5/2020 |
| JP | 2020202095 | A | 12/2020 |
| JP | 6842359 | B2 | 3/2021 |
| JP | 3239960 | U | 11/2022 |
| KR | 2013-0111318 | A | 10/2013 |
| KR | 2015-0109258 | A | 10/2015 |
| KR | 2015-0110313 | A | 10/2015 |
| KR | 2020-0008840 | A | 1/2020 |

OTHER PUBLICATIONS

Office Action dated Feb. 3, 2023 in corresponding Taiwan Patent Application No. 111124395, with English Translation.

Office Action dated Feb. 3, 2023 in corresponding Taiwan Patent Application No. 111124394, with English Translation.

Korean Office Action in related application Korean Application No. 2022-0081272 issued on Mar. 6, 2024, with Machine Translation.

Office Action for U.S. Appl. No. 17/743,554, issued Aug. 15, 2024.

Office Action dated Dec. 3, 2024 in corresponding Japanese Patent Application No. 2021-141031, with Machine Translation.

Office Action dated Jan. 28, 2025 in related Japanese Patent Application No. 2021-152249, with Machine Translation.

* cited by examiner

SOCKET CONNECTOR

INCORPORATION BY REFERENCE

This application is based upon and claims the benefit of priority from Japanese patent application No. 2021-141031, filed on Aug. 31, 2021, and Japanese patent application No. 2021-152249, filed on Sep. 17, 2021, the disclosure of which are incorporated herein in its entirety by reference.

BACKGROUND

The present disclosure relates to a socket connector.

As shown in FIG. 20 of the present application, Patent Literature 1 (Japanese Patent No. 6842359) discloses a connector 102 including a housing 100 made of an insulating material, and two inner auxiliary metal fittings 101. In the housing 100, a recessed part 103 into which an opponent connector is inserted, and a projecting part 104 are formed. The two inner auxiliary metal fittings 101 are attached to two island-like end parts 105 corresponding to both end parts of the projecting part 104 in the longitudinal direction. Each of the inner auxiliary metal fittings 101 covers the upper surface and three side surfaces of the corresponding island-like end part 105. Therefore, according to Patent Literature 1, it is possible to prevent the opponent connector from coming into contact with either one of the two island-like end parts 105 and thereby damaging that island-like end part 105 even when the opponent connector is inserted into the recessed part 103 of the housing 100 in a state in which the opponent connector is improperly positioned relative to the housing 100 in the longitudinal direction of the housing 100.

SUMMARY

However, in the above-described configuration disclosed in Patent Literature 1, the inner auxiliary metal fittings 101 are easily deformed, so there is a risk that they could damage the corresponding island-like end parts 105.

One of the objects of the present disclosure is to provide a technique for effectively protecting island-like end parts.

According to an aspect of the present disclosure, a socket connector includes: a housing in which an island-like part and a peripheral wall surrounding the island-like part project upward from a bottom plate; a plurality of contacts arranged in the housing; and a protective metal fitting configured to protect an island-like end part, the island-like end part being an end part of the island-like part in a pitch direction, the pitch direction being a direction in which the plurality of contacts are arranged, in which the protective metal fitting includes: an upper-surface protective part covering an upper surface of the island-like end part; two first side-surface protective parts extending downward from both ends of the upper-surface protective part in a width direction, the width direction being perpendicular to the pitch direction, and opposed to both side surfaces, respectively, of the island-like end part that face in the width direction; and two curling parts extending from lower ends of the two first side-surface protective parts, respectively, in such a manner that the two curling parts get closer to each other as they extend.

According to the present disclosure, island-like end parts can be effectively protected.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Embodiments according to the present disclosure will be described hereinafter with reference to FIGS. 1 to 19.

Figure 1:
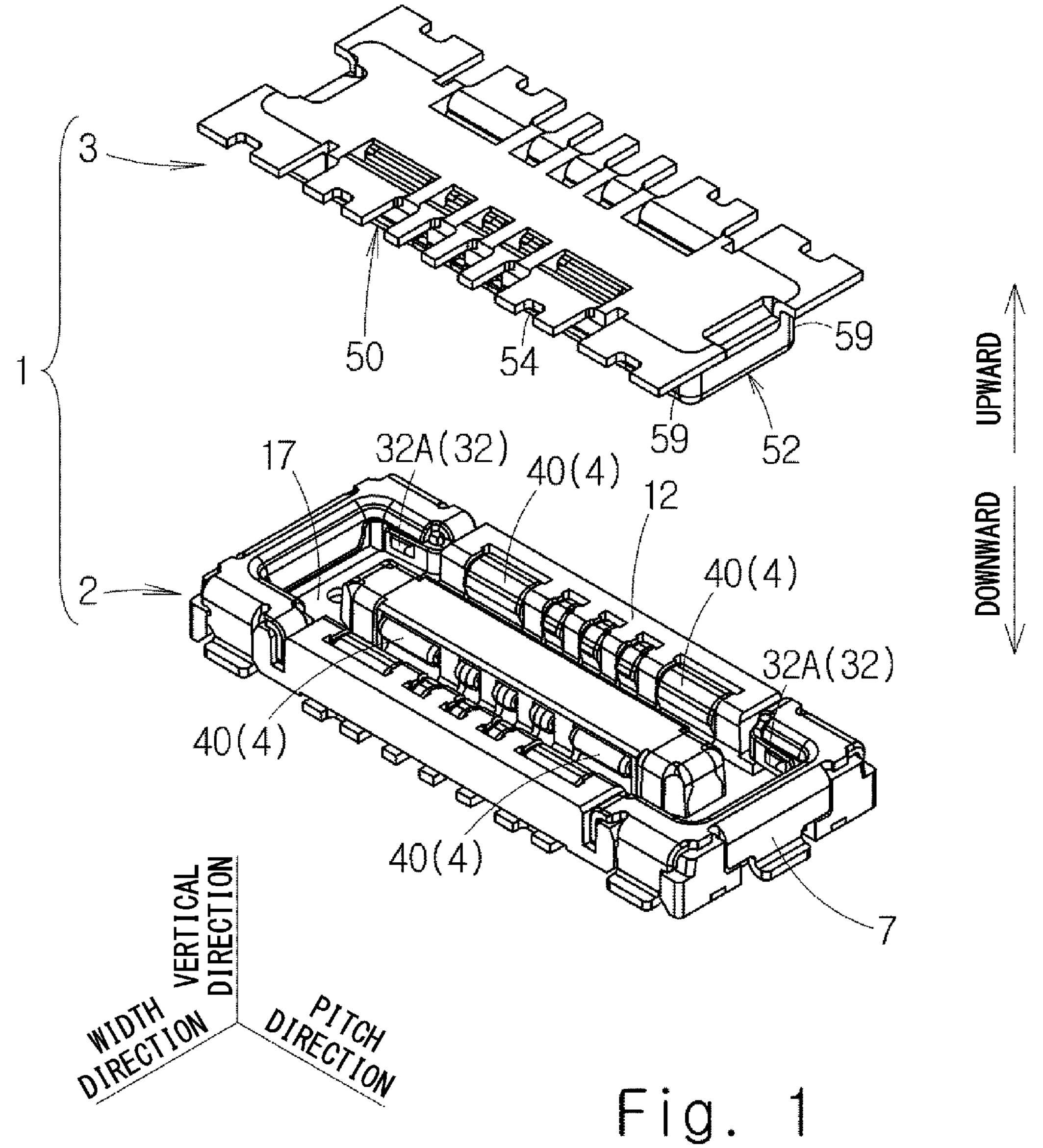
FIG. 1 is a perspective view of a connector assembly.

FIG. 1 shows a connector assembly 1 configured to mechanically and electrically connect two substrates that are parallel to each other. The connector assembly 1 includes a socket connector 2 (a first connector), which will be mounted on a socket side board, i.e., on one of the two boards, and a plug connector 3 (a second connector), which will be mounted on a plug side board, i.e., on the other board. The socket connector 2 is a kind of connector and is also referred to as a receptacle connector.

Figure 2:
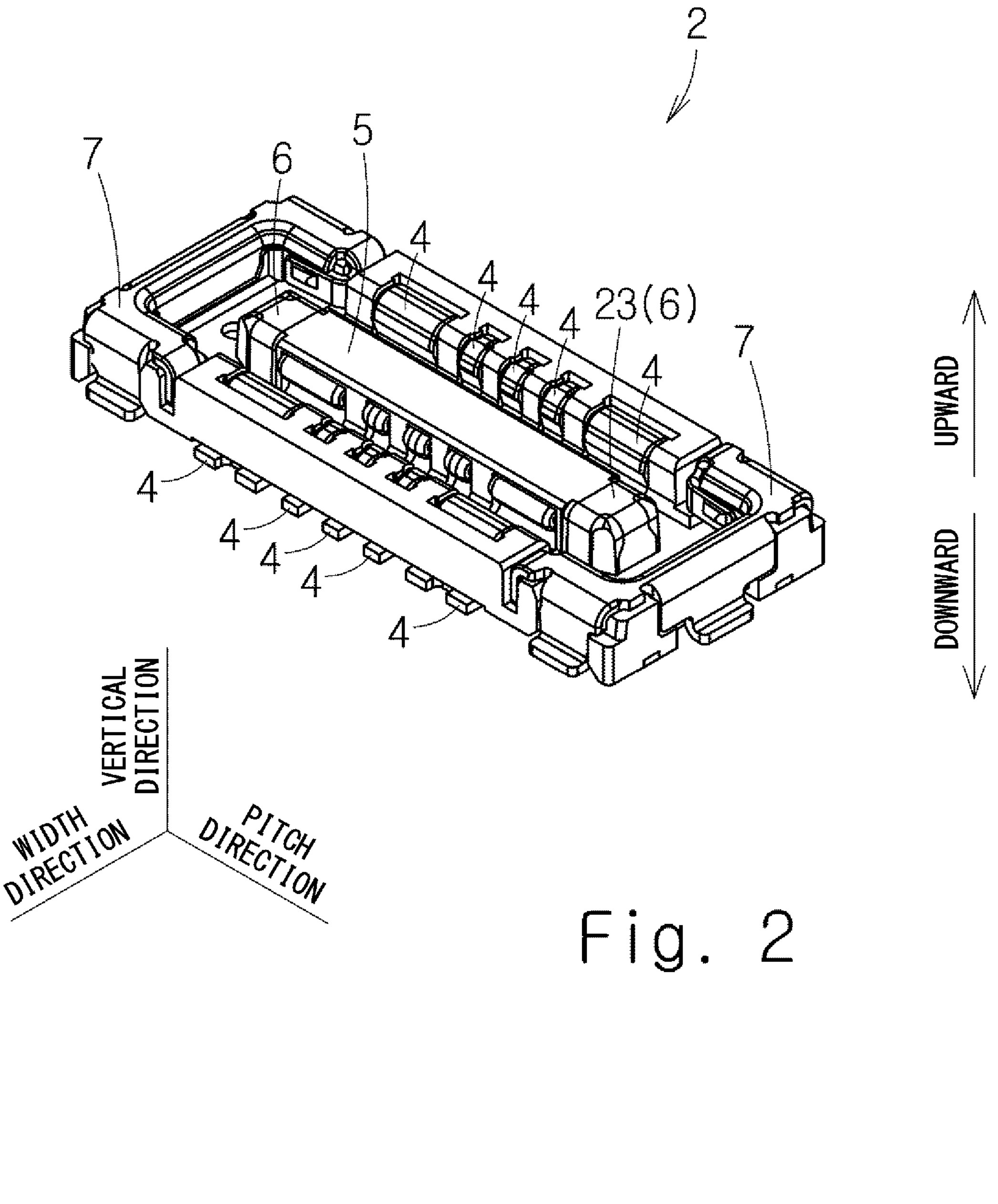
FIG. 2 is a perspective view of a socket connector.
Figure 3:
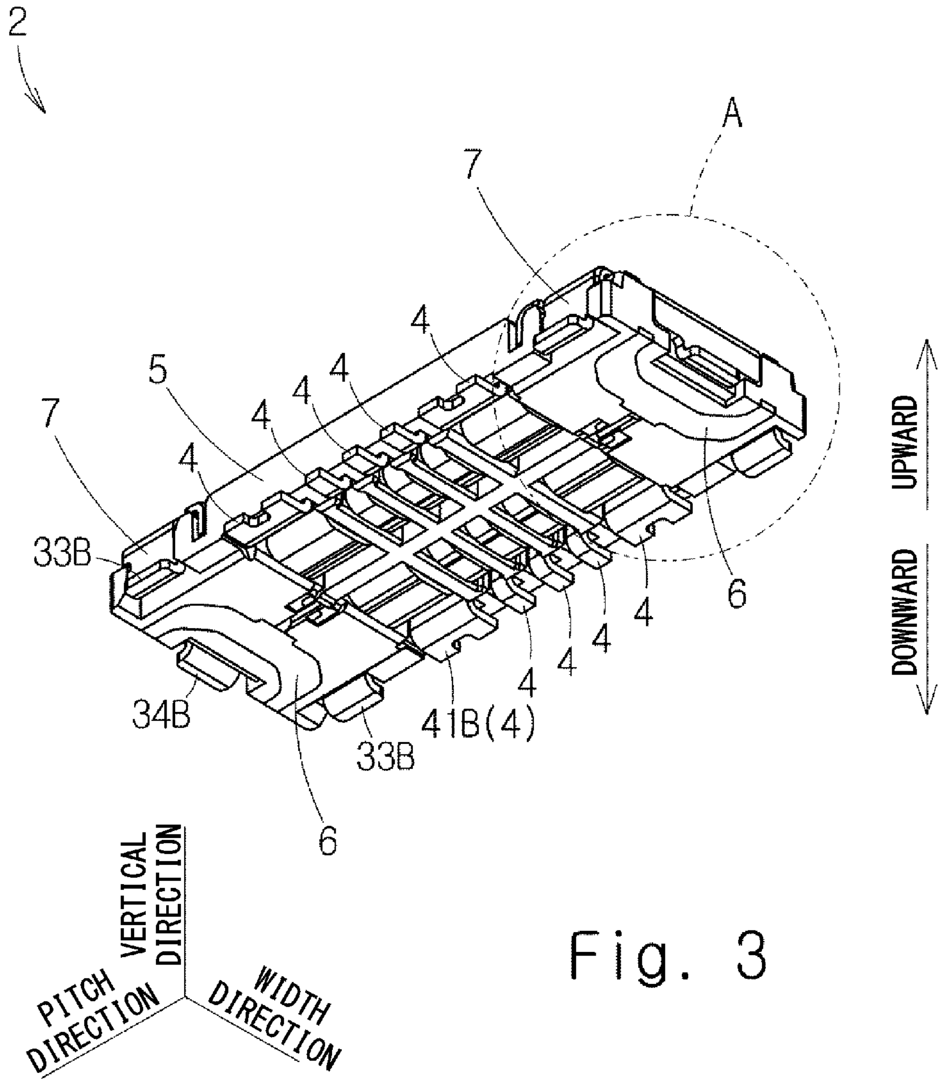
FIG. 3 is a perspective view of the socket connector as viewed at another angle.
Figure 4:
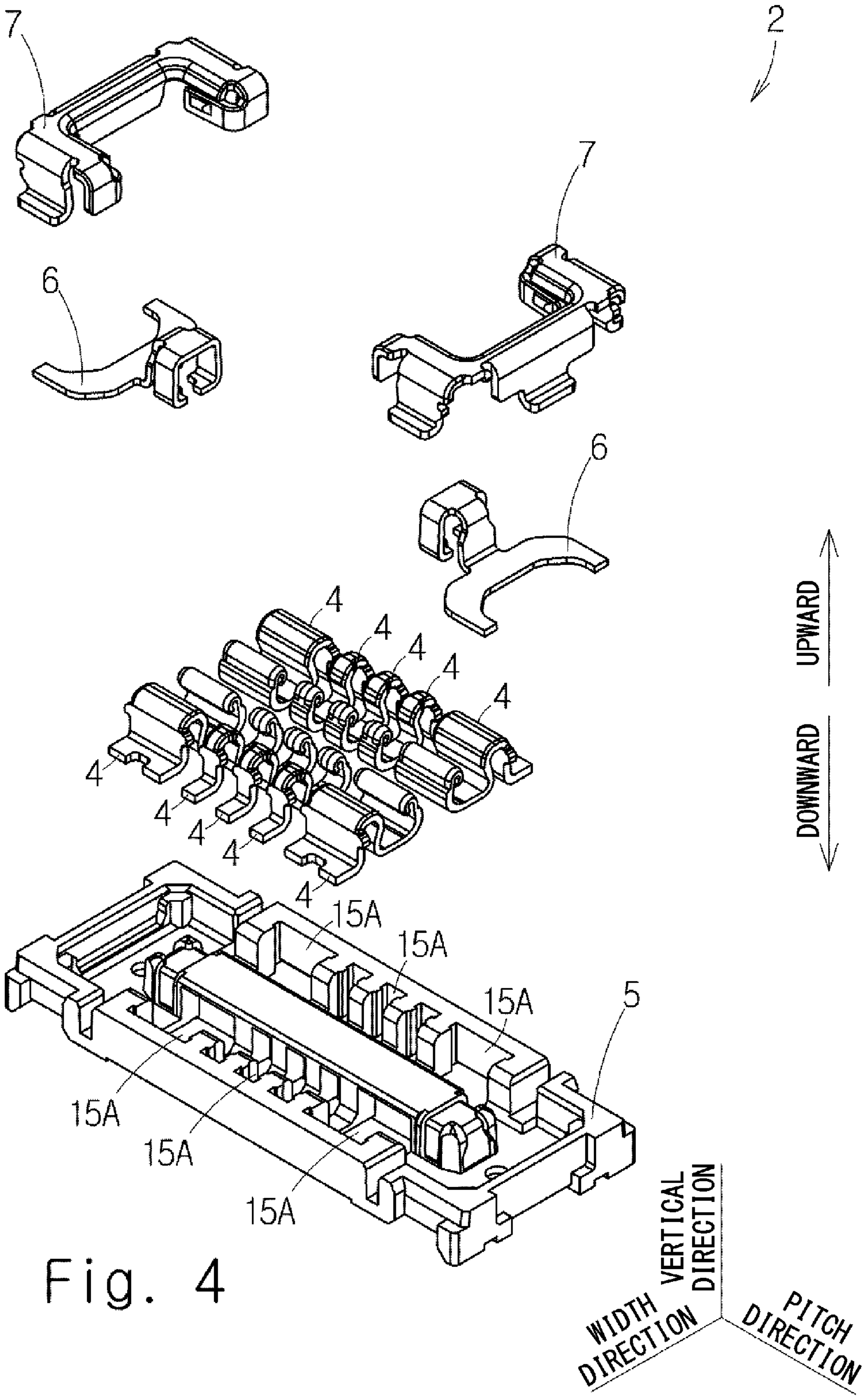
FIG. 4 is an exploded perspective view of the socket connector.

As shown in FIGS. 2 to 4, the socket connector 2 includes a plurality of socket contacts 4, a socket housing 5 that holds the plurality of socket contacts 4, two protective metal fittings 6, and two socket auxiliary metal fittings 7 (hold-downs).

The plurality of socket contacts 4 are arranged in two rows in a direction parallel to a connector mounting surface of the socket side board. The two socket auxiliary metal fittings 7 are used to fix the socket housing 5 to the connector mounting surface of the socket side board.

Here, with reference to FIGS. 1 and 2, a "vertical direction", a "pitch direction" and a "width direction" are defined.

The vertical direction, the pitch direction, and the width direction are perpendicular to each other.

As shown in FIG. 1, the vertical direction is a direction in which the plug connector 3 is inserted into and removed from the socket connector 2. Therefore, the vertical direction coincides with the height direction of the socket connector 2, and also coincides with the height direction of the plug connector 3. The vertical direction includes an upward direction (a removing direction) and a downward direction (a mating direction). The upward direction is a direction in which the plug connector 3 is removed from the socket connector 2. The downward direction is a direction in which the plug connector 3 is mated with the socket connector 2. The terms "upward" and "downward" are used just for the sake of simplifying the explanation, and do not specify the position of the connector assembly 1 when it is actually used.

As shown in FIG. 2, the pitch direction is a direction in which the plurality of socket contacts 4 are arranged (i.e., lined up). In the case where the plurality of socket contacts 4 are arranged in two rows parallel to each other as described in this embodiment, the pitch direction can be defined as a direction in which a plurality of socket contacts 4 included in one of the two rows are arranged (i.e., lined up). The pitch direction includes inward in the pitch direction and outward in the pitch direction. The inward in the pitch direction is a direction toward the center of the connector assembly 1 in the pitch direction. The outward in the pitch direction is a direction receding from the center of the connector assembly 1 in the pitch direction.

The width direction is a direction perpendicular to the vertical direction and the pitch direction. The width direction includes inward in the width direction and outward in the width direction. The inward in the width direction is a direction toward the center of the connector assembly 1 in the width direction. The outward in the width direction is a direction receding from the center of the connector assembly 1 in the width direction.

(Socket Connector 2)

With reference to FIGS. 2 to 14, the socket connector 2 will be described hereinafter in detail.

As described above with reference to FIGS. 2 to 4, the socket connector 2 includes the plurality of socket contacts 4, the socket housing 5 holding the plurality of socket contacts 4, the two protective metal fittings 6, and the two socket auxiliary metal fittings 7.

Figure 5:
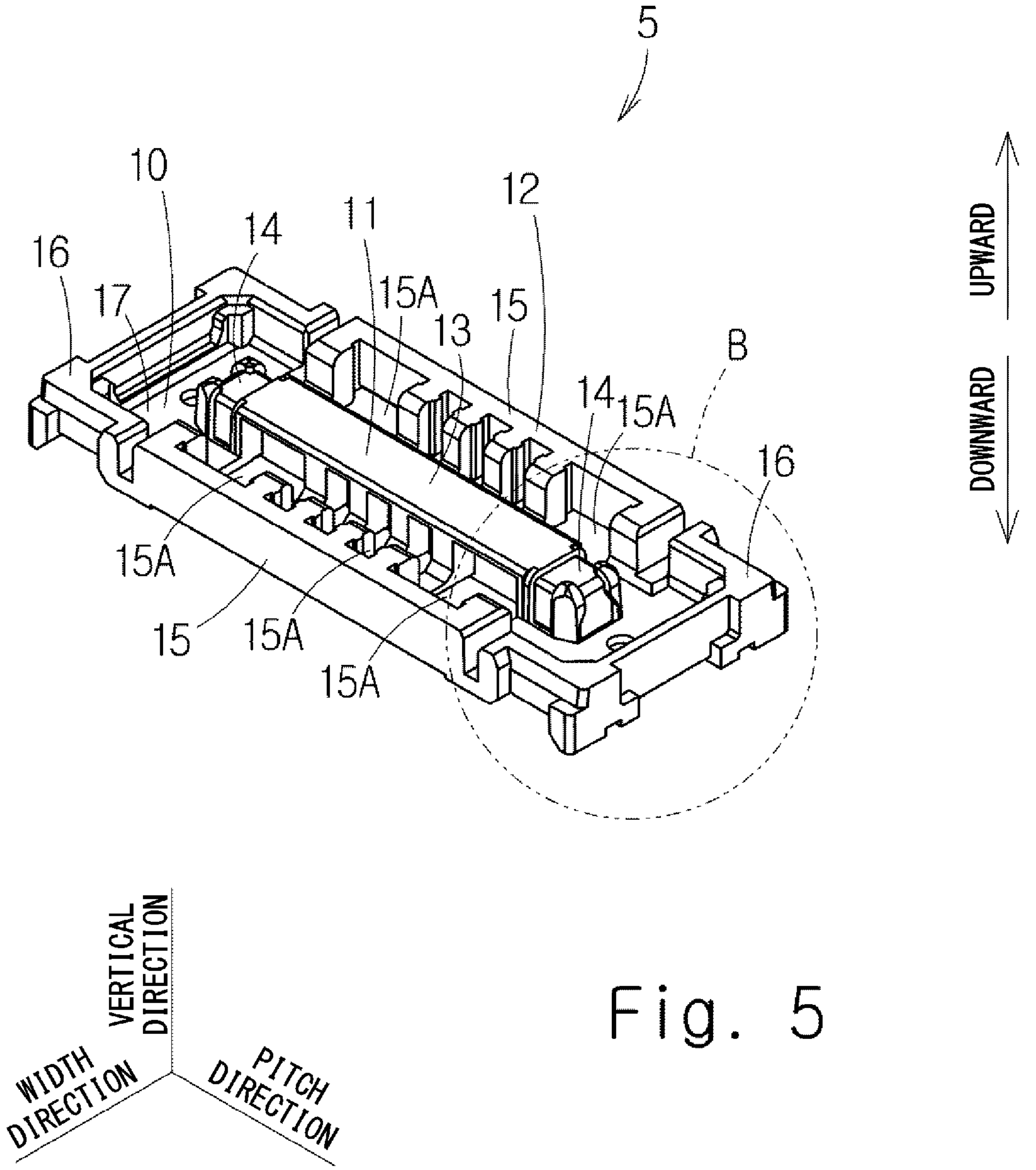
FIG. 5 is a perspective view of a socket housing.

As shown in FIG. 5, the socket housing 5 is a plate member made of an insulating resin, having a rectangular shape in the plan view, and is elongated in the pitch direction. The socket housing 5 includes a bottom plate 10, an island-like part 11, and a peripheral wall 12.

The bottom plate 10 is a flat plate whose thickness direction is parallel to the vertical direction.

The island-like part 11 projects upward from the center of the bottom plate 10 in the pitch and width directions, and extends in an elongated shape in the pitch direction. The island-like part 11 includes an island-like main part 13 and two island-like end parts 14. The two island-like end parts 14 correspond to both ends, respectively, of the island-like part 11 in the pitch direction. The island-like main part 13 is a part located between the two island-like end parts 14.

Figure 6:
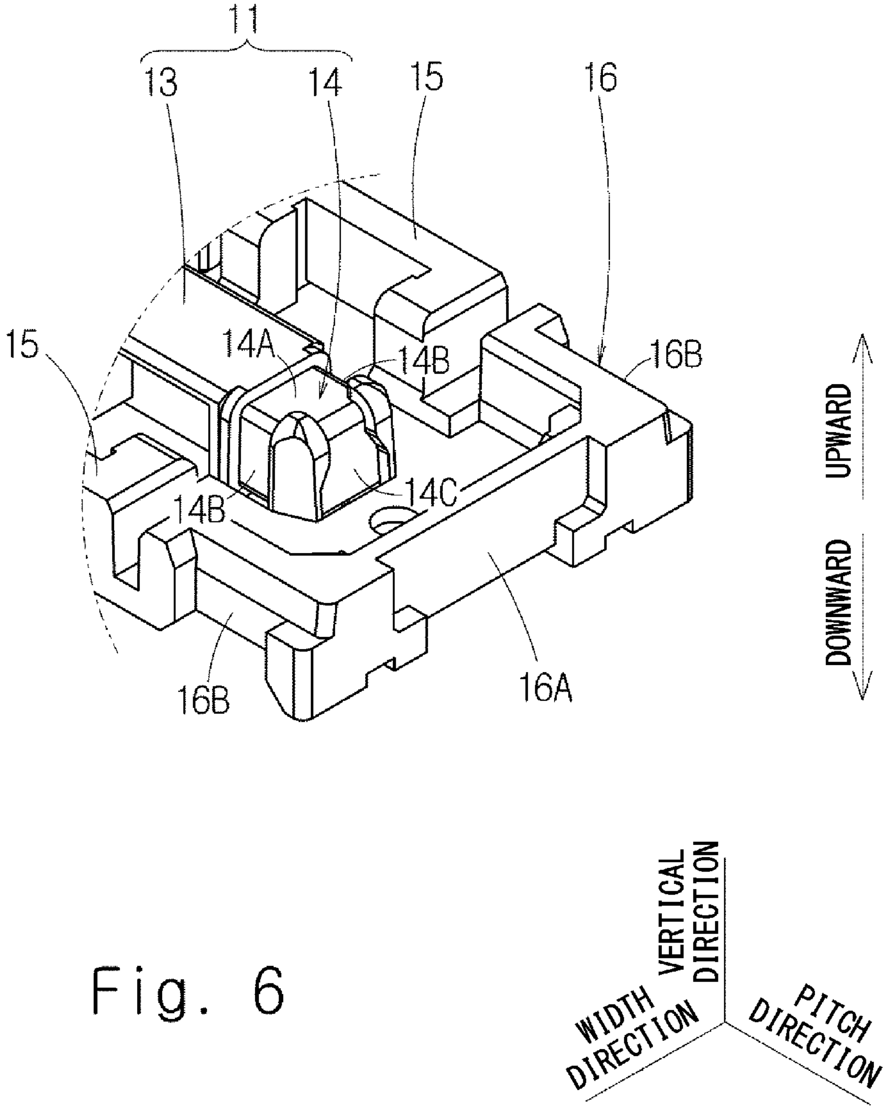
FIG. 6 is an enlarged view of a part B shown in FIG. 5.

As shown in FIG. 6, each of the island-like end parts 14 has an upper surface 14A facing upward, two crosswise side surfaces 14B (side surfaces) facing outward in the width direction, and a lengthwise side surface 14C (a side surface) facing outward in the pitch direction. The upper surface 14A is perpendicular to the vertical direction. Each of the crosswise side surfaces 14B is formed so as to face outward in the width direction and also face slightly upward. The lengthwise side surface 14C is perpendicular to the pitch direction.

Referring to FIG. 5 again, the peripheral wall 12 is formed annularly so as to surround the island-like part 11, and projects upward from the bottom plate 10. The peripheral wall 12 includes two contact holding walls 15 that hold the plurality of socket contacts 4, and two auxiliary metal fitting holding walls 16 that hold the two socket auxiliary metal fittings 7, respectively. The island-like part 11 and the two contact holding walls 15 are disposed between the two auxiliary metal fitting holding walls 16 in the pitch direction.

Each of the contact holding walls 15 is disposed so as to be opposed to the island-like part 11 in the width direction. A plurality of slits 15A for holding the plurality of socket contacts 4, respectively, are formed in each of the contact holding walls 15.

As shown in FIG. 6, each of the auxiliary metal fitting holding walls 16 is formed in a U-shape that opens inward in the pitch direction in the plan view. In each of the auxiliary metal fitting holding walls 16, a lengthwise press-fitting groove 16A that opens outward in the pitch direction and extends in the vertical direction, and two crosswise press-fitting grooves 16B that open outward in the width direction and extend in the vertical direction are formed. The lengthwise press-fitting groove 16A and the two crosswise press-fitting grooves 16B are used to attach the corresponding socket auxiliary metal fitting 7 to the auxiliary metal fitting holding wall 16.

Further, as shown in FIG. 5, the peripheral wall 12 is formed annularly with spaces from the island-like part 11 in the pitch and width directions, so that an annular mating recessed part 17 is formed between the island-like part 11 and the peripheral wall 12.

As shown in FIGS. 2 and 5, the two protective metal fittings 6 are provided to protect the two island-like end parts 14 of the island-like part 11, respectively. As shown in FIG. 4, each of the protective metal fittings 6 is formed by punching and bending one metal plate. Since the shapes of the two protective metal fittings 6 are identical to each other, only one of the protective metal fittings 6 will be described hereinafter, and the description of the other protective metal fitting 6 will be omitted.

Figure 7:
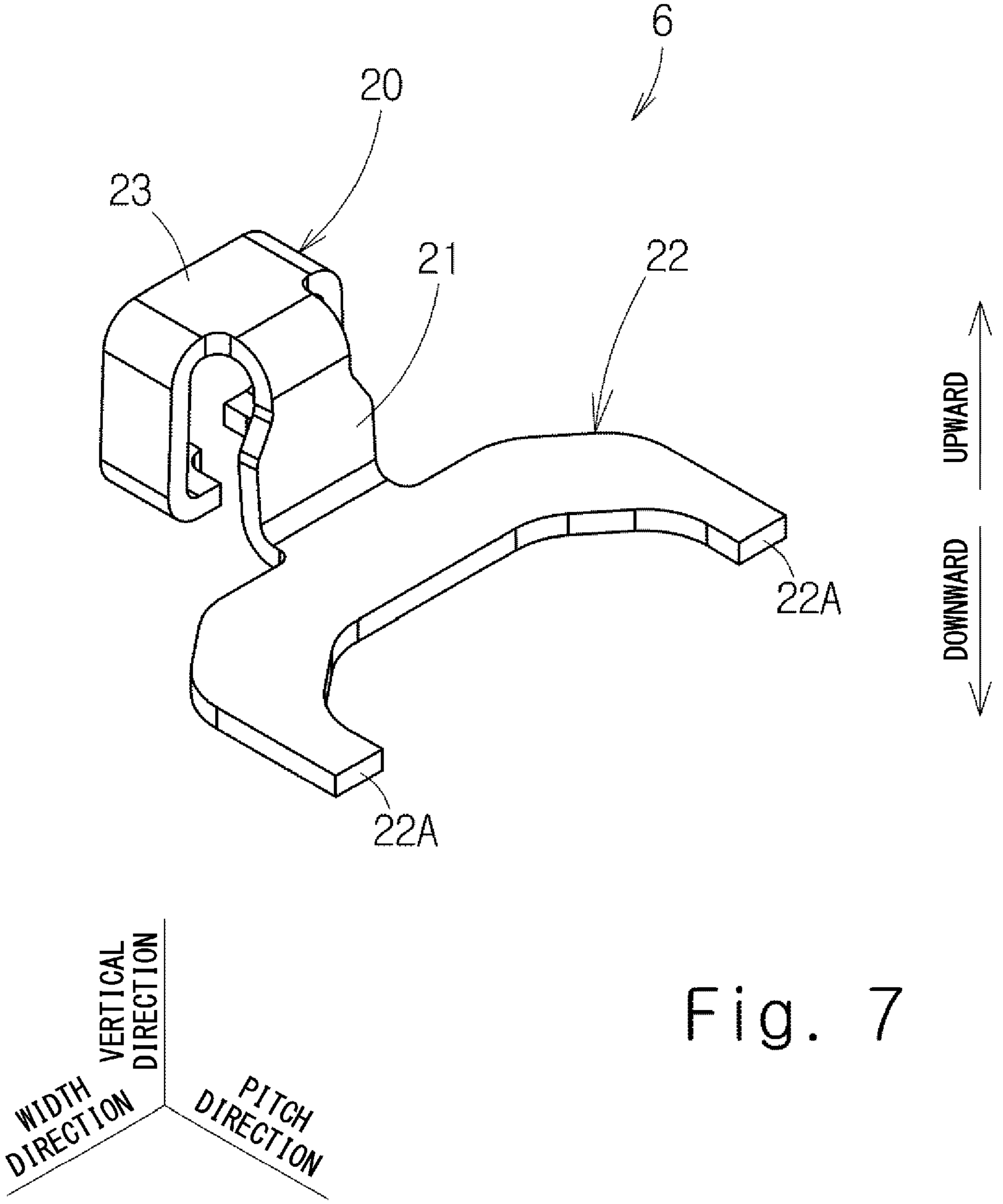
FIG. 7 is a perspective view of a protective metal fitting.
Figure 8:
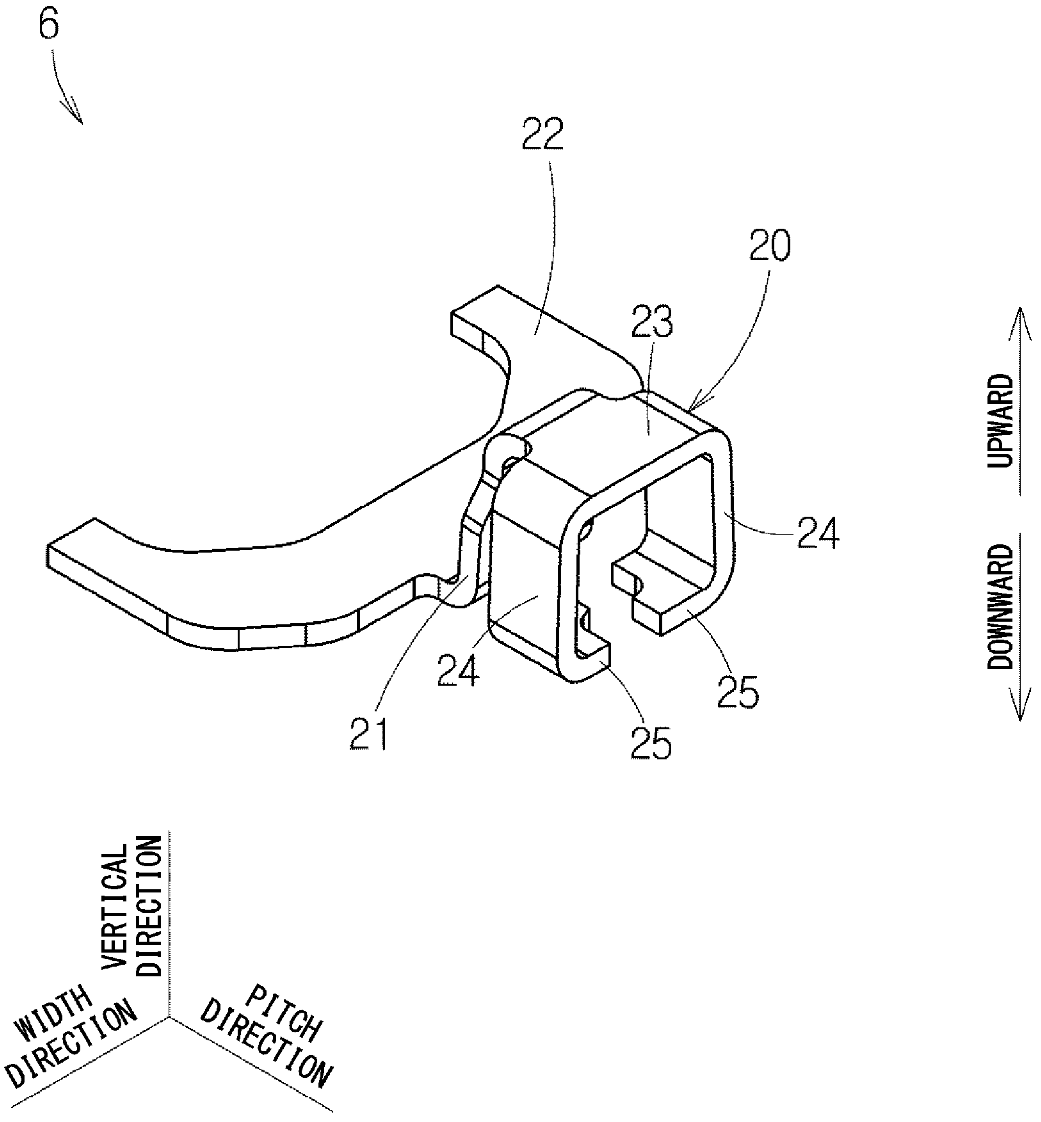
FIG. 8 is a perspective view of the protective metal fitting as viewed at another angle.
Figure 9:
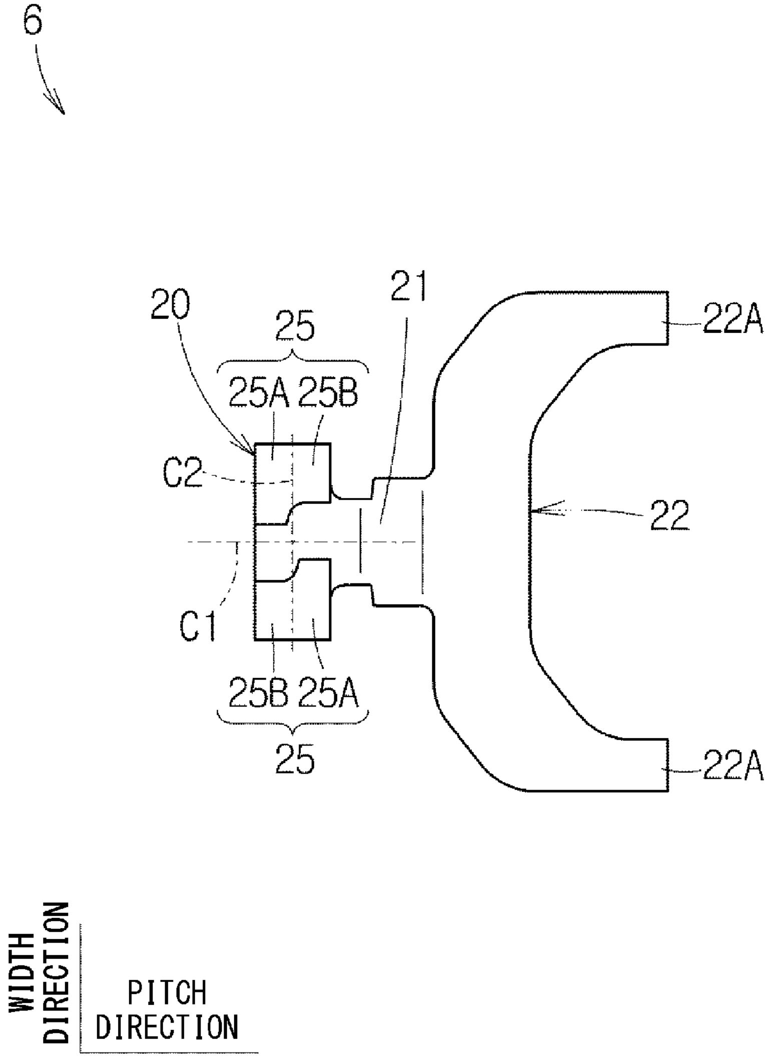
FIG. 9 is a bottom view of the protective metal fitting.

FIGS. 7 to 9 show the protective metal fitting 6. The protective metal fitting 6 includes a C-shaped protective part 20, a lengthwise protective part 21 (a second side-surface protective part), and a connection part 22. The C-shaped protective part 20, the lengthwise protective part 21, and the connection part 22 are extend outwardly in the pitch direction in this recited order and in an unbroken manner.

As shown in FIG. 8, the C-shaped protective part 20 is formed in a C-shape that opens downward as viewed along the pitch direction. The C-shaped protective part 20 includes an upper-surface protective part 23, two crosswise surface protective parts 24 (first side-surface protective parts), and two curling parts 25.

The upper-surface protective part 23 is a part whose thickness direction is perpendicular to the vertical direction. The upper-surface protective part 23 is arranged so as to be opposed to the upper surface 14A of the island-like end part 14 shown in FIG. 6 in the vertical direction. The upper-surface protective part 23 covers and protects the upper surface 14A of the island-like end part 14.

Referring to FIG. 8 again, the two crosswise surface protective parts 24 extend downward from both ends of the upper-surface protective part 23 in the width direction. The thickness direction of each of crosswise surface protective parts 24 is substantially perpendicular to the width direction, and to be more precise, is slightly upward. The two crosswise surface protective parts 24 are disposed so as to be opposed to the two crosswise side surfaces 14B, respectively, of the island-like end part 14 shown in FIG. 6 in the width direction. The two crosswise surface protective parts 24 cover and protect the two crosswise side surfaces 14B, respectively, of the island-like end part 14.

Referring to FIG. 8 again, the two curling parts 25 extend from the lower ends of the two crosswise surface protective parts 24, respectively, in such a manner that the curling parts 25 get closer to each other as they extend. That is, the two curling parts 25 extend inward in the width direction from the lower ends of the two crosswise surface protective parts 24, respectively. The thickness direction of each of the curling parts 25 is perpendicular to the vertical direction.

FIG. 9 shows a bottom view of the protective metal fitting 6. As shown in FIG. 9, the two curling parts 25 are formed asymmetrically with respect to a first bisecting line C1 that bisects the C-shaped protective part 20 in the width direction. Further, each of the curling parts 25 is formed asymmetrically with respect to a second bisecting line C2 (a bisecting line) that bisects the C-shaped protective part 20 in the pitch direction. Specifically, each of the curling parts 25 includes a first curling part 25A and a second curling part 25B. The first and second curling parts 25A and 25B are adjacent to each other (i.e., side by side) in the pitch direction. The first curling part 25A is longer than the second curling part 25B in the width direction. Further, the first curling part 25A of one of the curling parts 25 and the second curling part 25B of the other curling part 25 are opposed to each other in the width direction, and the second curling part 25B of the one curling part 25 and the first curling part 25A of the other curling part 25 are opposed to each other in the width direction. That is, the shapes of the tips of the two curling parts 25 are complementary to each other. In this way, it is possible to secure a large maximum size of each of the curling parts 25 in the width direction, and to solve a backlash problem which would otherwise occur when the C-shaped protective part 20 is formed is solved.

That is, in order to form a bending part between the upper-surface protective part 23 and each of the crosswise surface protective parts 24 so that each of the crosswise surface protective parts 24 becomes perpendicular to the upper-surface protective part 23 in FIG. 8, it is necessary to temporarily incline the two crosswise surface protective parts 24 inward in the width direction and bring them closer to each other in consideration of the backlash. However, the inclination angle at the time when the two crosswise surface protective parts 24 are inclined inward in the width direction and the maximum size of each of the curling parts 25 in the width direction are in the relationship of trade-off. Therefore, as shown in FIG. 9, this trade-off is solved by making the two curling parts 25 asymmetrical with respect to the second bisecting line C2 and forming the two curling parts 25 so that the shapes of their tips become complementary to each other as described above.

Now, referring to FIG. 7 again, the lengthwise protective part 21 extends downward from the end part on the outer side in the pitch direction of the upper-surface protective part 23 of the C-shaped protective part 20. The thickness direction of the lengthwise protective part 21 is perpendicular to the pitch direction. The lengthwise protective part 21 is opposed to the lengthwise side surface 14C of the island-like end part 14 shown in FIG. 6 in the pitch direction. The lengthwise protective part 21 covers and protects the lengthwise side surface 14C of the island-like end part 14.

As shown in FIG. 7, the connection part 22 extends outward in the pitch direction from the lower end of the lengthwise protective part 21. The thickness direction of the connection part 22 is parallel to the vertical direction. The connection part 22 is formed in a Y-shape in the plan view. That is, the connection part 22 branches off in the width direction while extending outward in the pitch direction. Further, in this embodiment, the protective metal fitting 6 is mounted on the socket housing 5 by insert-molding. The connection part 22 is used to hold the protective metal fitting 6 within the mold during the insert-molding. That is, the connection part 22 has two branched parts 22A projecting outward in the pitch direction, and these two branched parts 22A are connected to a common carrier during the insert-molding. After the insert-molding, the two branched parts 22A are separated (or cut out) from the carrier.

As shown in FIG. 2, the two socket auxiliary metal fittings 7 are provided to fix the socket housing 5 to the socket side board. As shown in FIG. 4, each of the socket auxiliary metal fittings 7 is formed by punching and bending one metal plate. Since the shapes of the two socket auxiliary metal fittings 7 are identical to each other, only one of the socket auxiliary metal fittings 7 will be described hereinafter, and the description of the other socket auxiliary metal fitting 7 will be omitted.

Figure 10:
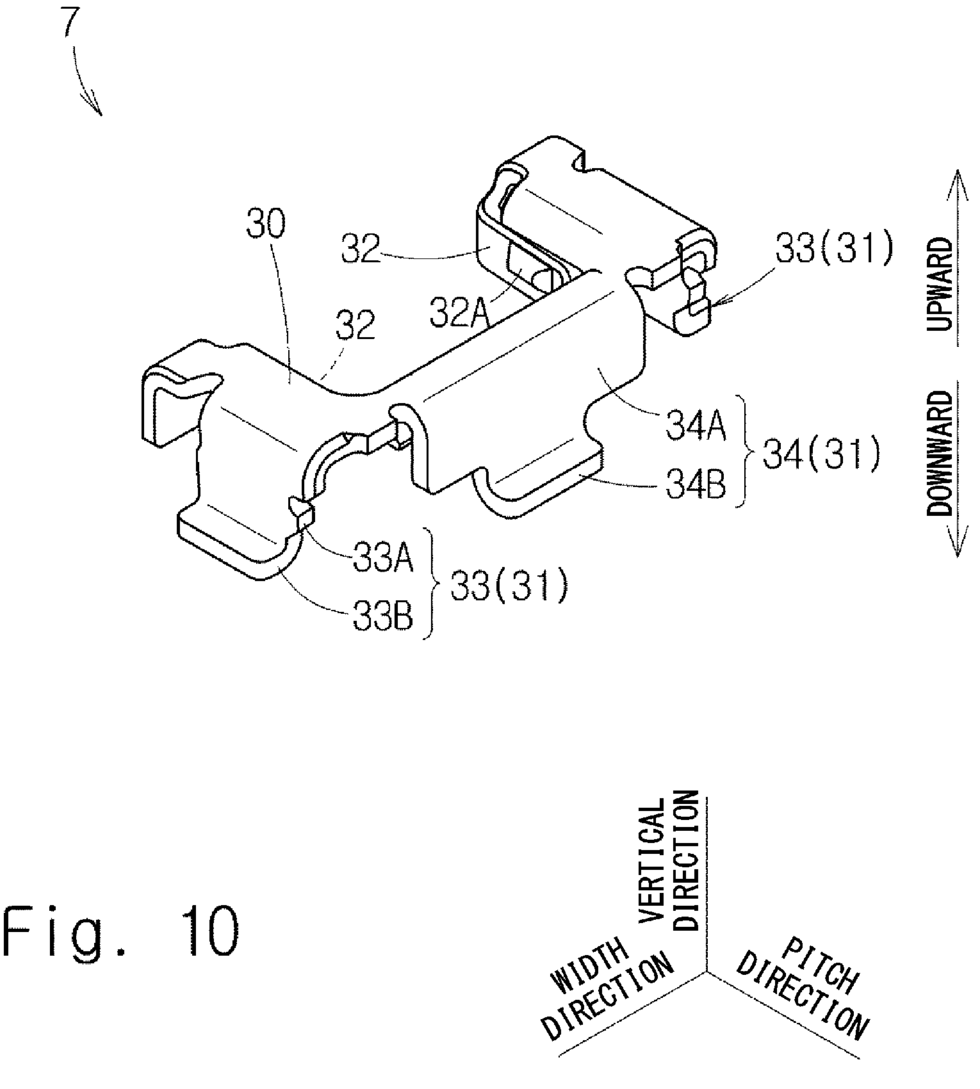
FIG. 10 is a perspective view of a socket auxiliary metal fitting.

As shown in FIG. 10, the socket auxiliary metal fitting 7 includes an upper-surface protective part 30, three soldering legs 31, and two spring pieces 32.

The upper-surface protective part 30 has a U-shape that opens inward in the pitch direction in the plan view, and covers and protects the upper surface of the auxiliary metal fitting holding wall 16 shown in FIG. 6. The thickness direction of the upper-surface protective part 30 coincides with the vertical direction.

Three soldering legs 31 are formed so as to extend downward from the upper-surface protective part 30. The three soldering legs 31 include two crosswise soldering legs 33 and one lengthwise soldering leg 34.

The two crosswise soldering legs 33 are formed so as to project outward in the width direction from the upper-surface protective part 30. Each of the crosswise soldering legs 33 includes a press-fitting part 33A and a soldering part 33B formed at the lower end of the press-fitting part 33A. The press-fitting part 33A is press-fitted into the corresponding crosswise press-fitting groove 16B shown in FIG. 6. The soldering part 33B is soldered to an electrode pad of the socket side board.

The lengthwise soldering leg 34 is formed so as to project outward in the pitch direction from the upper-surface protective part 30. The lengthwise soldering leg 34 includes an extending part 34A and a soldering part 34B formed at the lower end of the extending part 34A. The extending part 34A is inserted into the lengthwise press-fitting groove 16A shown in FIG. 6. The soldering part 34B is soldered to an electrode pad of the socket side board.

Each of the spring pieces 32 is a cantilever supported by the upper-surface protective part 30 and extends in the pitch direction. Each of the spring pieces 32 is configured to be elastically displaceable in the width direction, and has a raised part 32A rising (i.e., projecting) inward in the width direction.

Figure 11:
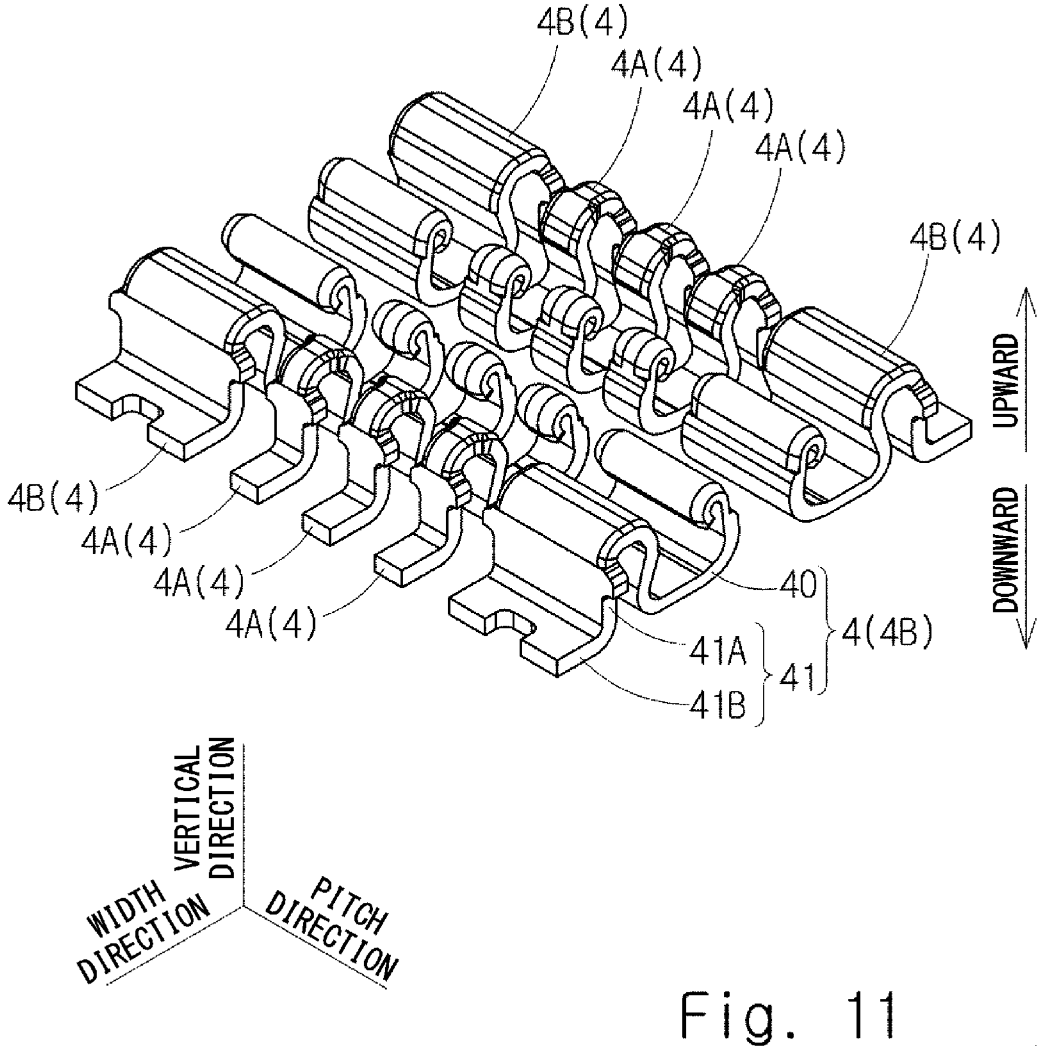
FIG. 11 is a perspective view of a plurality of socket contacts.

FIG. 11 shows the plurality of socket contacts 4. A plurality of socket contacts 4 included in one of the two rows include three signal contacts 4A, which are relatively small in the pitch direction, and two power-supply contacts 4B, which are relatively large in the pitch direction. The three signal contacts 4A are disposed between the two power-supply contacts 4B. Each of the socket contacts 4 is formed by punching and bending one metal plate.

Each of the socket contacts 4 includes a contact part 40 having a U-shape that opens upward and a soldering leg 41 extending downward from the end part on the outer side of the contact part 40 in the width direction. The soldering leg 41 includes a press-fitting part 41A and a soldering part 41B. The press-fitting part 41A is press-fitted into the corresponding slit 15A shown in FIG. 5. The soldering part 41B is soldered to an electrode pad of the socket side board.

Figure 12:
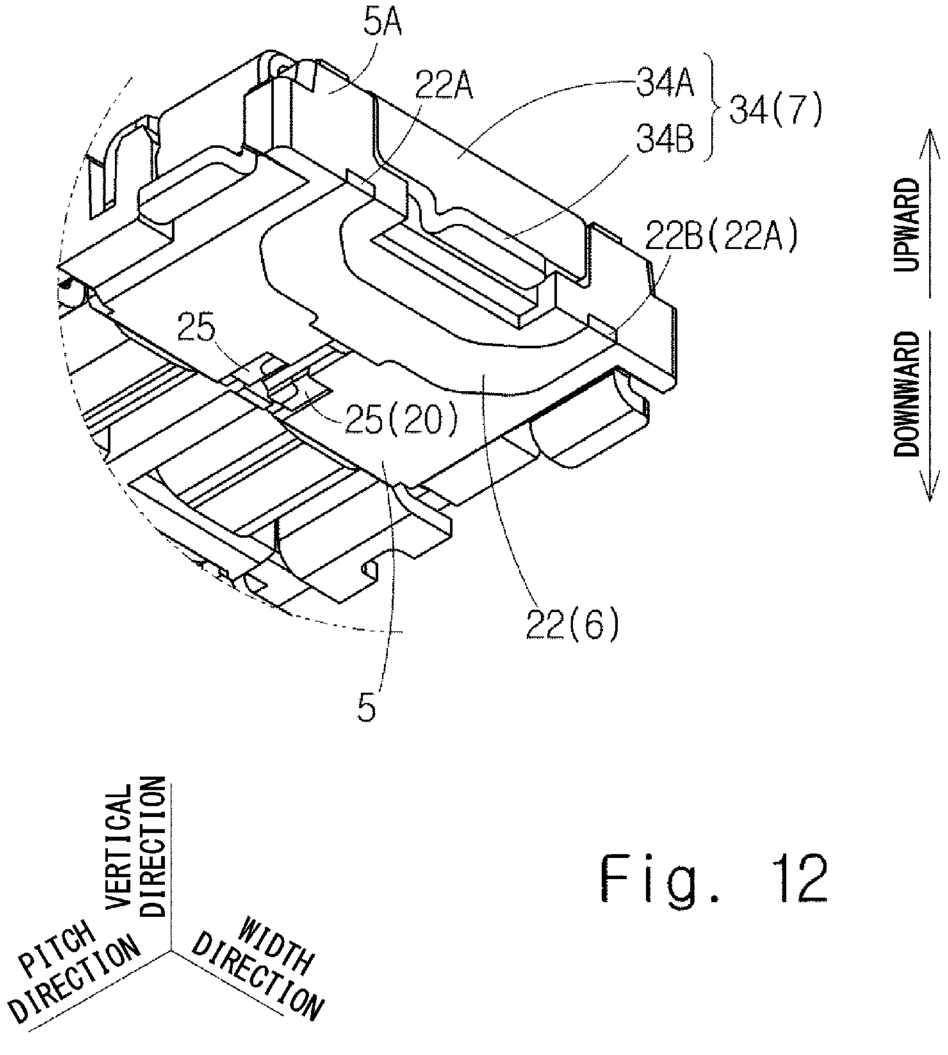
FIG. 12 is an enlarged view of a part A shown in FIG. 3.
Figure 13:
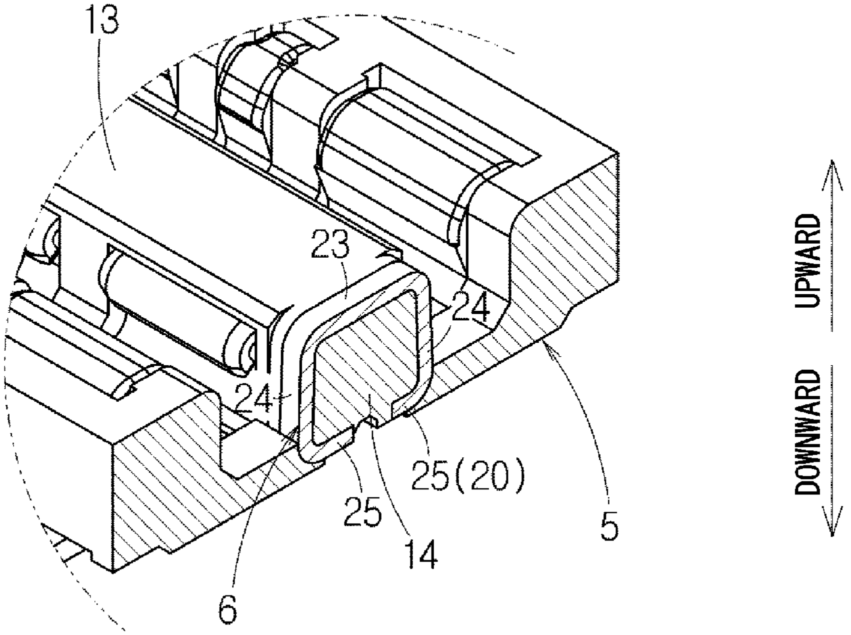
FIG. 13 is a cross-sectional perspective view of the socket connector when the socket connector is cut in the pitch direction.
Figure 13:
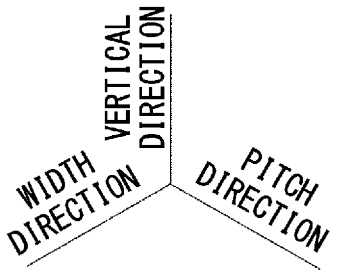
Figure 14:
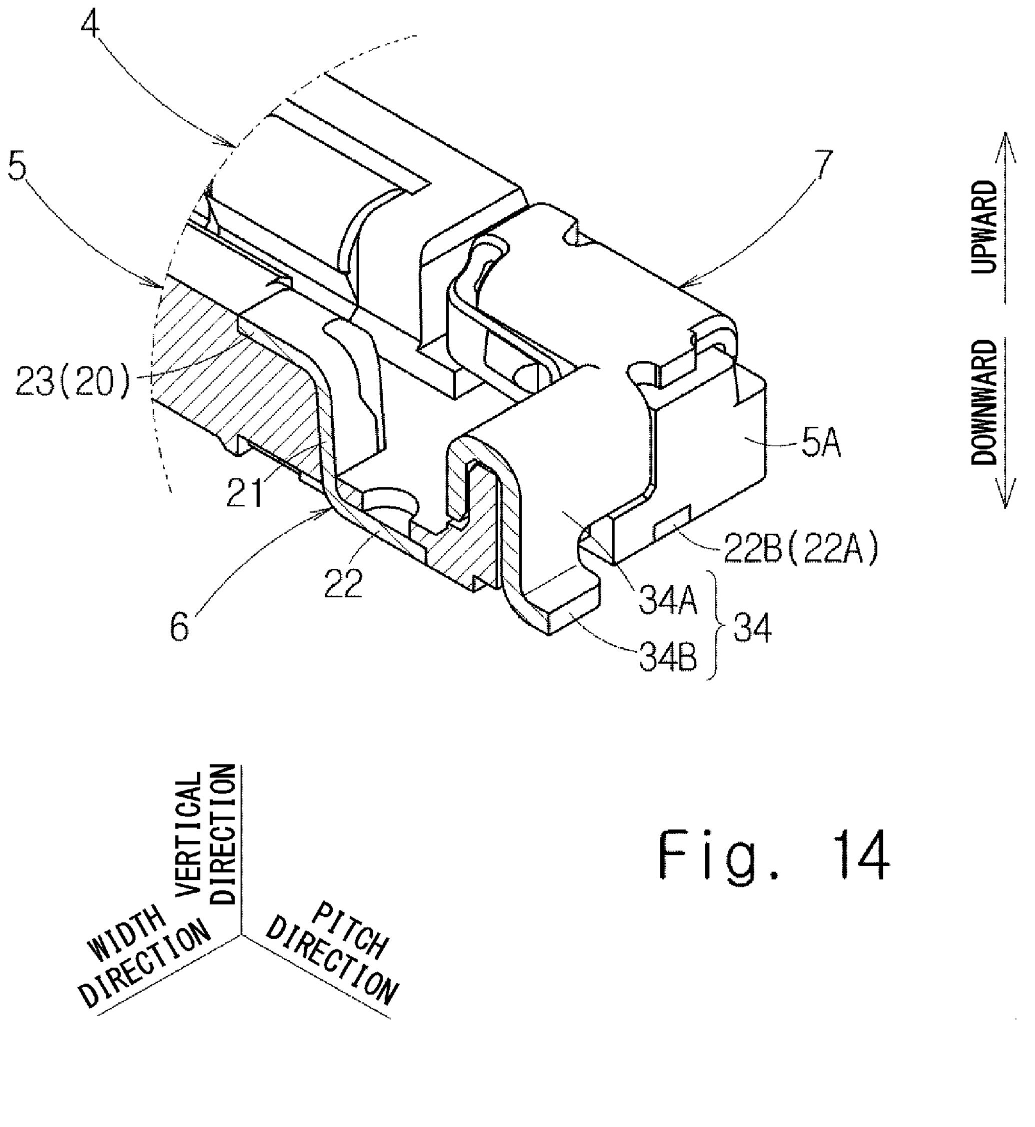
FIG. 14 is a cross-sectional perspective view of the socket connector when the socket connector is cut in the width direction.

FIGS. 12 to 14 show the protective metal fitting 6 integrated with the socket housing 5 by insert-molding.

As shown in FIGS. 12 and 13, the two curling parts 25 of the C-shaped protective part 20 of the protective metal fitting 6 are exposed downward from the socket housing 5. Similarly, the connection part 22 of the protective metal fitting 6 is exposed downward from the socket housing 5.

As shown in FIGS. 12 and 14, the two branched parts 22A of the connection part 22 of the protective metal fitting 6 are exposed outward in the pitch direction from the socket housing 5. That is, the end faces 22B of the two branched parts 22A of the connection part 22 of the protective metal fitting 6, which face outward in the pitch direction, are located on the same plane as the end face 5A of the socket housing 5, which also faces outward in the pitch direction. The end faces 22B are cut surfaces that are formed when the connection part 22 of the protective metal fitting 6 is separated (i.e., cut out) from the carrier.

As shown in FIG. 12, the connection part 22 branches off in the width direction so as to bypass (i.e., to extend around and thereby evade) the soldering part 34B of the lengthwise soldering leg 34 of the socket auxiliary metal fitting 7. Therefore, it is possible to secure a sufficient clearance between the protective metal fitting 6 and the socket auxiliary metal fitting 7.

(Plug Connector 3)

Next, the plug connector 3 will be described with reference to FIGS. 15 to 17. Note that since the position of the plug connector 3 relative to the socket connector 2 is univocally determined in a state in which the plug connector 3 is mated with the socket connector 2, the three directions already defined with reference to FIGS. 1 to 4 will also be used as they are in the description of the plug connector 3 below.

Figure 15:
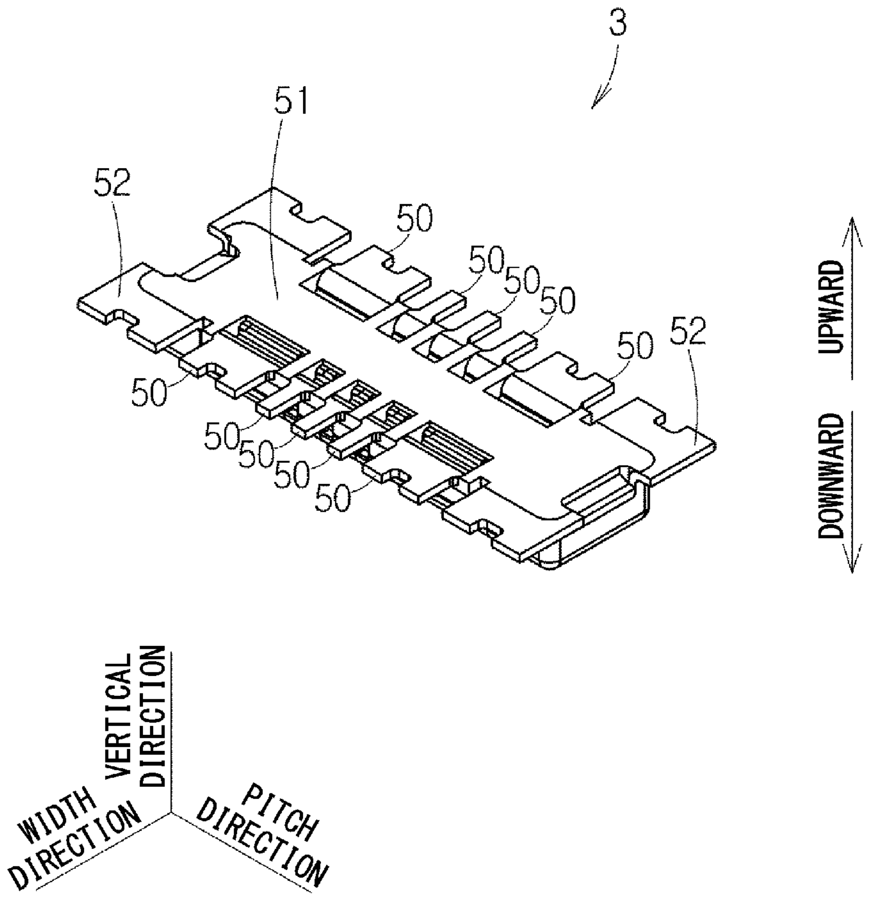
FIG. 15 is a perspective view of a plug connector.
Figure 16:
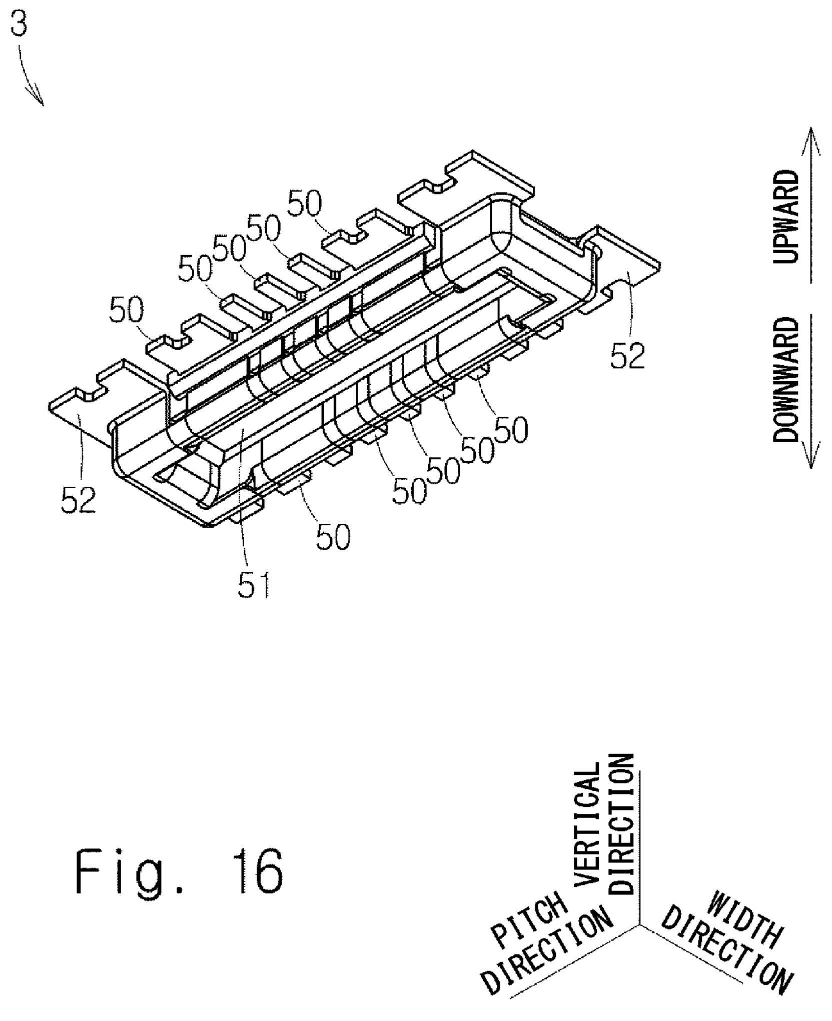
FIG. 16 is a perspective view of the plug connector as viewed at another angle.
Figure 17:
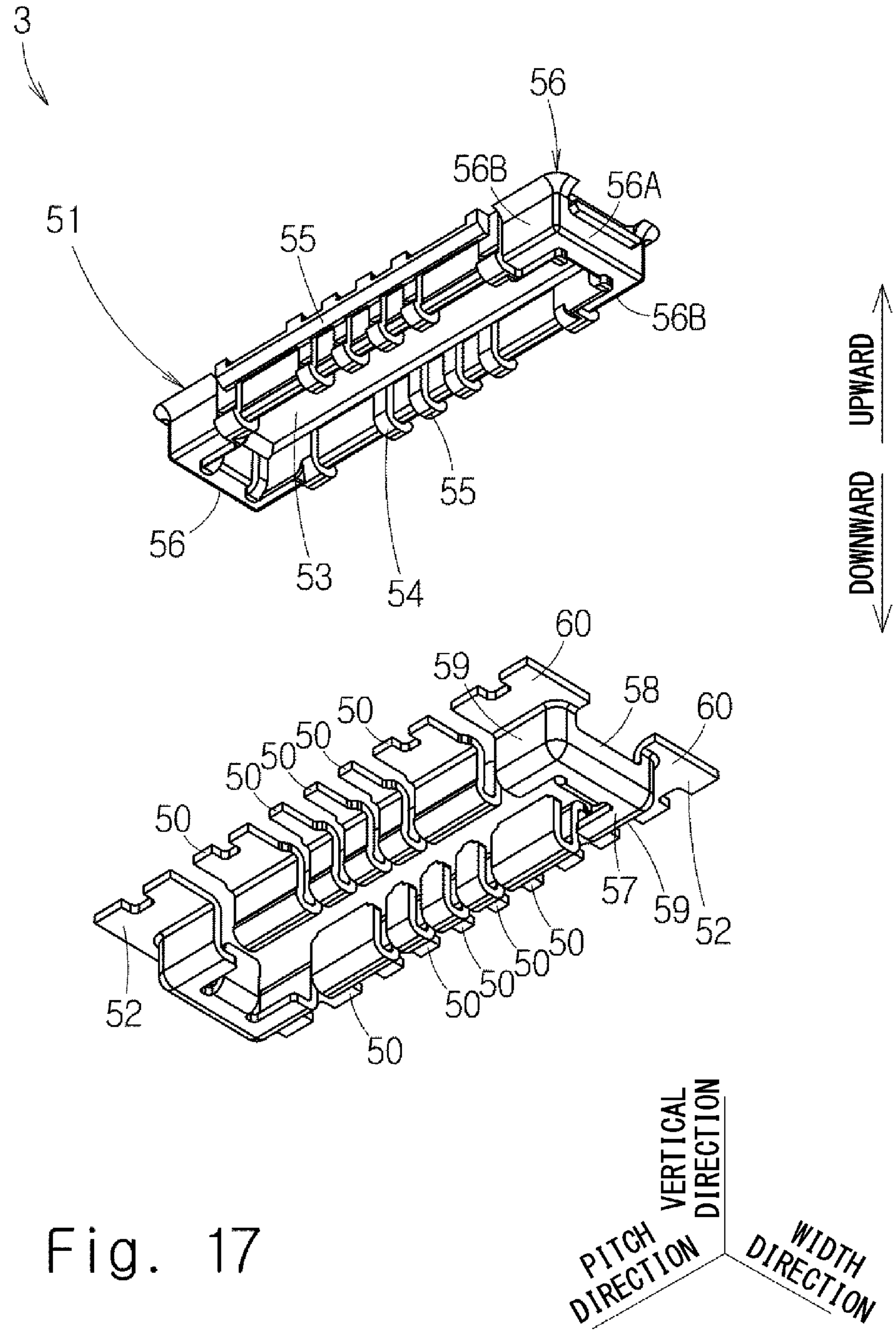
FIG. 17 is an exploded perspective view of the plug connector.

As shown in FIGS. 15 to 17, the plug connector 3 includes a plurality of plug contacts 50, a plug housing 51 holding the plurality of plug contacts 50, and two plug auxiliary metal fittings 52. The plurality of plug contacts 50 and the two plug auxiliary metal fittings 52 are integrally formed with the plug housing 51 by insert-molding.

As shown in FIG. 17, the plug housing 51 is a plate member made of an insulating resin, having a rectangular shape in the plan view, and is elongated in the pitch direction.

The plug housing 51 includes a bottom plate 53 and a peripheral wall 54.

The bottom plate 53 is a flat plate whose thickness direction is parallel to the vertical direction.

The peripheral wall 54 is annularly formed and protrudes downward from the bottom plate 53. The peripheral wall 54 includes two contact holding walls 55 that hold the plurality of plug contacts 50, and two auxiliary metal fitting holding walls 56 that hold the two plug auxiliary metal fittings 52, respectively.

Each of the auxiliary metal fitting holding walls 56 is formed in a U-shape that opens inward in the pitch direction in the plan view.

Each of the plug contacts 50 is formed by punching and bending one metal plate.

Two plug auxiliary metal fittings 52 are provided to fix the plug housing 51 to the plug side board. Each of the plug auxiliary metal fittings 52 is formed by punching and bending one metal plate. Since the shapes of the two plug auxiliary metal fittings 52 are identical to each other, only one of the plug auxiliary metal fittings 52 will be described hereinafter, and the description of the other plug auxiliary metal fitting 52 will be omitted.

As also shown in FIG. 17, each of the plug auxiliary metal fittings 52 includes a lower-surface protective part 57, a lengthwise protective part 58, two crosswise protective parts 59, and two flange parts 60.

The lower-surface protective part 57 has a U-shape that opens inward in the pitch direction in the plan view, and covers and protects the lower surface of the auxiliary metal fitting holding wall 56. The thickness direction of the lower-surface protective part 57 is parallel to the vertical direction.

The lengthwise protective part 58 is a part that covers and protects a lengthwise end face 56A of the auxiliary metal fitting holding wall 56 that faces outward in the pitch direction. The lengthwise protective part 58 extends upward from the end on the outer side of the lower-surface protective part 57 in the pitch direction.

The two crosswise protective parts 59 cover and protect two crosswise end faces 56B, respectively, of the auxiliary metal fitting holding wall 56 that face outward in the width direction. The two crosswise protective parts 59 extend upward from both ends, respectively, on the outer side of the lower-surface protective part 57 in the width direction.

The two flange parts 60 are parts that are soldered to the plug side board. The two flange parts 60 extend outward in the width direction from the upper ends of the two crosswise protective parts 59, respectively. The two flange parts 60 may be connected to each other.

Further, in this embodiment, each of the plug auxiliary metal fittings 52 is formed by a drawing process. Therefore, the lengthwise protective part 58 is directly connected to the two crosswise protective parts 59 without the lower-surface protective part 57 being interposed therebetween. As a result, the strength of the plug auxiliary metal fittings 52 in the vertical direction is ensured, and the plug auxiliary metal fittings 52 are less likely to be squashed in the vertical direction.

(Manufacturing Method)

Next, a method for manufacturing the socket connector 2 will be described.

Firstly, the socket housing 5 and the two protective metal fittings 6 shown in FIG. 4 are integrally formed by insert-molding.

Next, a plurality of socket contacts 4 and two socket auxiliary metal fittings 7 are attached to the socket housing 5. Specifically, the press-fitting part 41A of the soldering leg 41 of each of the socket contacts 4 shown in FIG. 11 is press-fitted into the corresponding slit 15A of the socket housing 5 shown in FIG. 4 from below thereof. Further, the press-fitting parts 33A of the two crosswise soldering legs 33 of the socket auxiliary metal fitting 7 shown in FIG. 10 are press-fitted into the two crosswise press-fitting grooves 16B, respectively, of the corresponding auxiliary metal fitting holding wall 16 of the socket housing 5 shown in FIG. 6 from above thereof.

Next, a method for manufacturing the plug connector 3 will be described. As shown in FIGS. 16 and 17, a plurality of plug contacts 50, a plug housing 51, and two plug auxiliary metal fittings 52 are integrally formed by insert-molding.

(Use)

Next, how to use the connector assembly 1 will be described.

In order to mount the socket connector 2 shown in FIG. 3 on the socket side board, the soldering part 41B of each of the socket contacts 4, and the two soldering parts 33B and 34B of each of the socket auxiliary metal fittings 7 are soldered to corresponding electrode pads, respectively, provided on the socket side board by solder reflowing.

Similarly, in order to mount the plug connector 3 shown in FIG. 15 on the plug side board, each of the plug contacts 50 and each of the plug auxiliary metal fittings 52 are soldered to corresponding electrode pads, respectively, provided on the plug side board by solder reflowing.

In order to mate the plug connector 3 with the socket connector 2, as shown in FIG. 1, the plug connector 3 is lowered (i.e., moved downward) toward the socket connector 2 in a state in which the plug connector 3 is opposed to the socket connector 2 in the vertical direction, so that the annular peripheral wall 54 of the plug connector 3 is inserted into the annular mating recessed part 17 of the socket connector 2. As a result, each of the plug contacts 50 is inserted into the U-shaped contact part 40 of the corresponding socket contact 4 while pushing the contact part 40 outward and thereby increasing the gap therebetween in the width direction. In this way, a mechanical and electrical connection between each of the plug contacts 50 and the corresponding socket contact 4 is achieved. Further, at the same time, each of plug auxiliary metal fittings 52 is inserted between the two spring pieces 32 of the corresponding socket auxiliary metal fitting 7 while pushing the two spring pieces 32 aside and outward in the width direction. As a result, a mechanical and electrical connection between each of the plug auxiliary metal fittings 52 and the corresponding socket auxiliary metal fitting 7 is achieved. The raised part 32A of each of the spring pieces 32 is in contact with the corresponding crosswise protective part 59. The electrical contact between each of the plug auxiliary metal fittings 52 and a respective one of the socket auxiliary metal fittings 7 may be used for supplying electric power.

Figure 18:
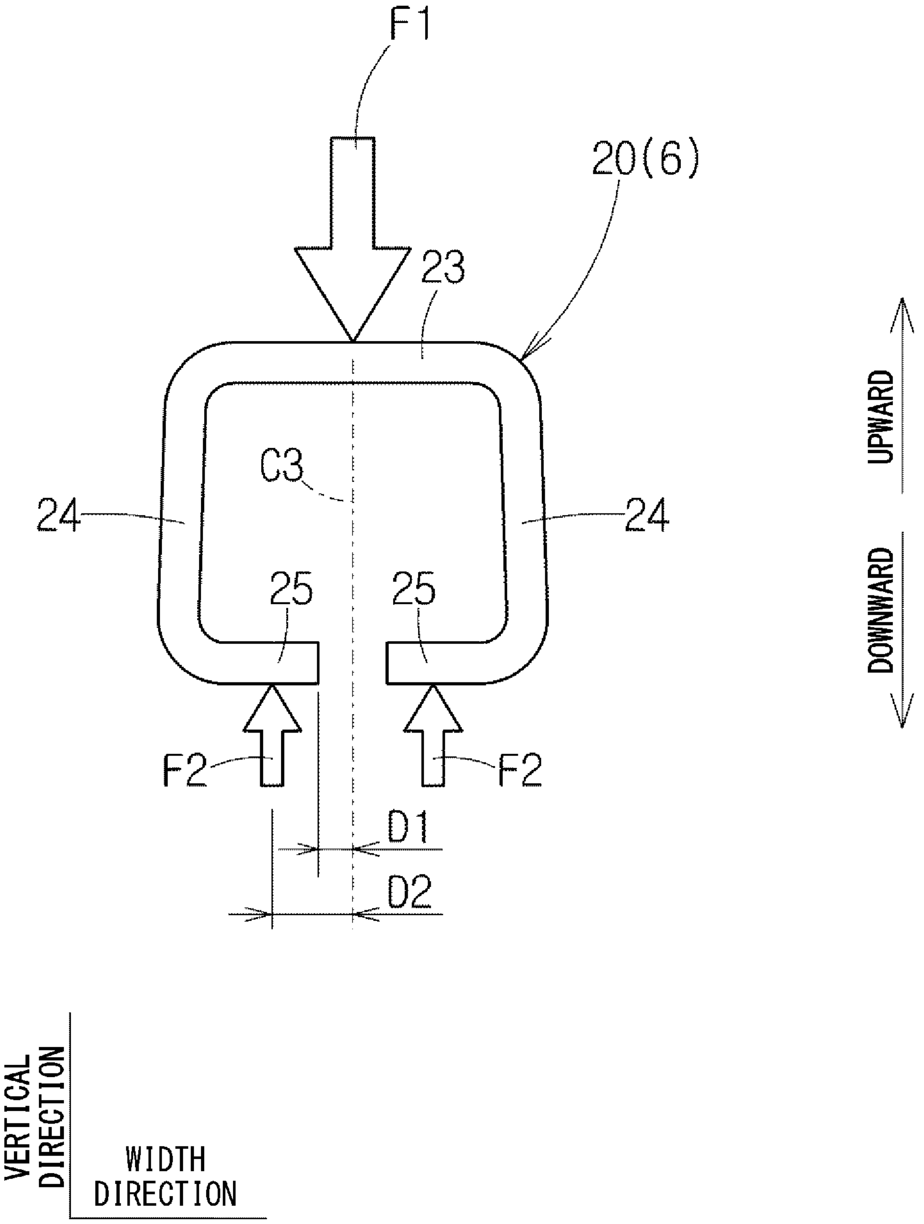
FIG. 18 is a diagram for explaining movements of the protective metal fitting.

Incidentally, it is not easy to visually check the relative positional relation between the plug connector 3 and the socket connector 2 until just before the plug connector 3 is mated with the socket connector 2. Therefore, in practice, a worker (or an operator) needs to shake the plug connector 3 in the pitch and width directions (e.g., move the plug connector 3 left and right, and back and forth) while pressing the plug connector 3 against the socket connector 2, and to wait until the plug connector 3 fits into the mating recessed part 17 of the socket connector 2. Regarding this process, there are cases where the worker (or the operator) mistakenly recognizes that the plug connector 3 is in the proper position relative to the socket connector 2 in the pitch direction even though the actual position of the plug connector 3 is deviated from the proper position, and thereby pushes the plug connector 3 hard against the socket connector 2. In such cases, the lower-surface protective part 57 of one of the plug auxiliary metal fittings 52 of the plug connector 3 shown in FIG. 17 comes into contact with the upper-surface protective part 23 of the C-shaped protective part 20 of the protective metal fitting 6 of the socket connector 2 shown in FIG. 2, so that the upper-surface protective part 23 is pushed downward. FIG. 18 shows a state in which the upper-surface protective part 23 is pushed downward by the plug connector 3. When the plug connector 3 pushes the upper-surface protective part 23 downward, a distributed load distributed in the width direction acts downward on the upper-surface protective part 23. In FIG. 18, this distributed load is indicated by a resultant force F1 for the sake of simplifying the explanation. When the resultant force F1 acts on the upper-surface protective part 23, this resultant force F1 is received by the two curling parts 25, a distributed load distributed in the width direction acts upward on each of the curling parts 25. In FIG. 18, these distributed loads are indicted by resultant forces F2 for the sake of simplifying the explanation. Each of the resultant forces F2 acts at the center of the corresponding curling part 25 in the width direction. In this embodiment, since a distance D1 from the bisecting line C3, which bisects the C-shaped protective part 20 in the width direction, to each of the curling parts 25 is short, a deviation D2 between the resultant force F1 and each of the resultant forces F2 in the width direction is small. Therefore, a moment acting on each of the crosswise protective parts 24, caused by the resultant forces F1 and F2 is small, and principally, only a compressive force in the vertical direction acts on each of the crosswise protective parts 24. As a result, the crosswise surface protective parts 24 themselves are not inclined, and they merely deform so as to bulge outward in the width direction. Therefore, even when the resultant force F1 acts on the upper-surface protective part 23, the C-shaped protective part 20 is less likely to be squashed in the vertical direction.

Figure 19:
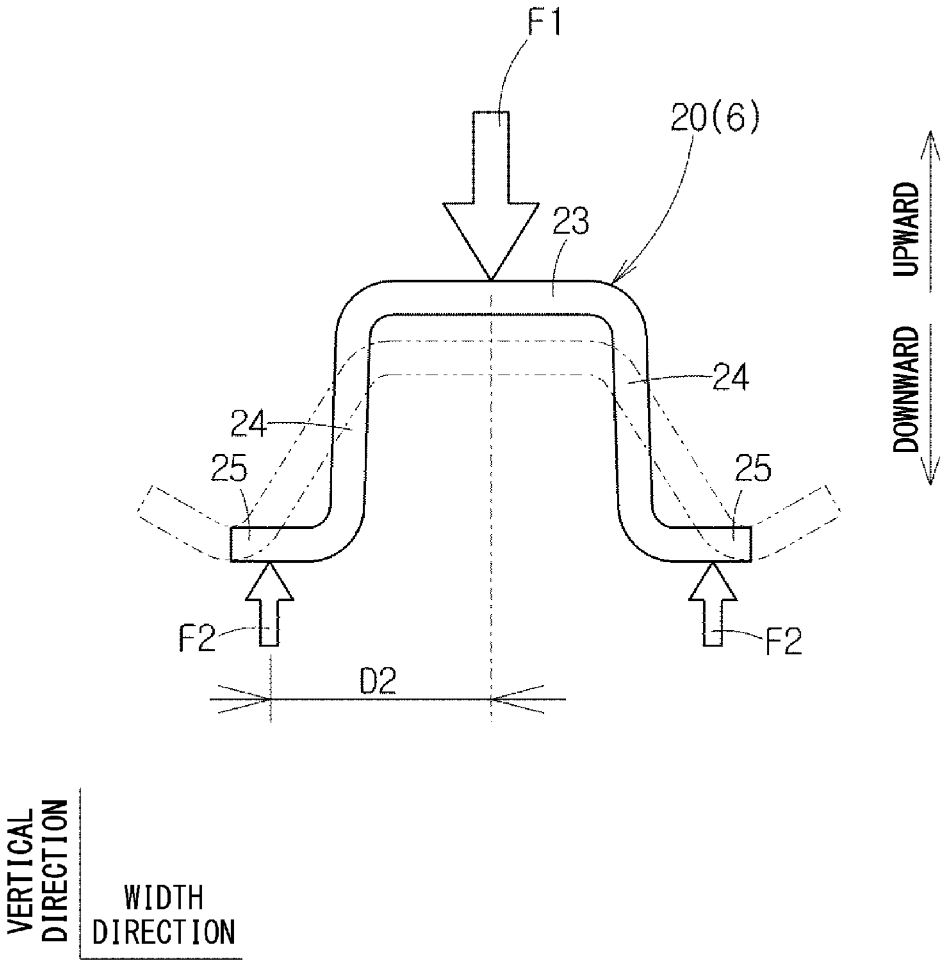
FIG. 19 is a diagram for explaining movements of a protective metal fitting according to a comparative example.
Figure 20:
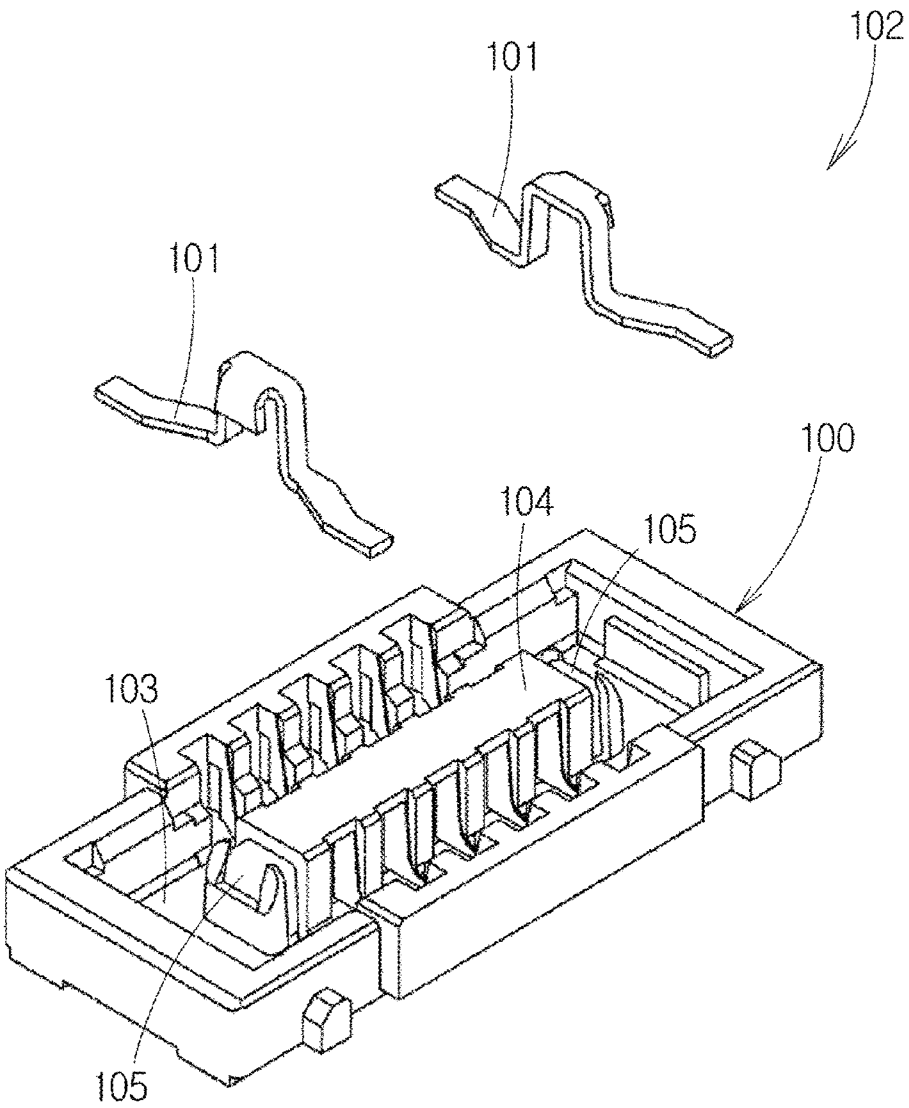
Fig. 20 PRIOR ART
FIG. 20 is a simplified drawing of FIG. 3 of Patent Literature 1.

In contrast to this, as shown in FIG. 19, if the two curling parts 25 protrude outward in the width direction from the lower ends of the two crosswise surface protective parts 24, respectively, a deviation D2 between the resultant forces F1 and F2 in the width direction is large, so that a moment acting on each of the crosswise surface protective parts 24, caused by the resultant forces F1 and F2 is large. As a result, each of the curling parts 25 moves outward in the width direction as indicated by double-dashed chain lines. Therefore, in the comparative example shown in FIG. 19, it can be said when the resultant force F1 acts on the upper-surface protective part 23, the protective metal fitting 6 is easily squashed in the vertical direction.

From the above-described examination, as shown in FIG. 18, by adopting the configuration in which the two curling parts 25 protrude inward in the width direction from the lower ends of the two crosswise surface protective parts 24, respectively, it is possible to provide a technical advantageous effect that when the plug connector 3 is mated the socket connector 2, the protective metal fittings 6 are unlikely to be broken (or damaged).

A preferred embodiment according to the present disclosure has been described above, and they have features described below.

That is, a socket connector 2 includes: a socket housing 5 (a housing) in which an island-like part 11 and a peripheral wall 12 surrounding the island-like part 11 project upward from a bottom plate 10; a plurality of contacts 4 (contacts) arranged in the housing 5; and a protective metal fitting 6 configured to protect an island-like end part 14, the island-like end part being an end part of the island-like part 11 in a pitch direction, the pitch direction being a direction in which the plurality of contacts 4 are arranged. As shown in FIGS. 6 to 9, the protective metal fitting 6 includes: an upper-surface protective part 23 covering an upper surface 14A of the island-like end part 14; two crosswise surface protective parts 24 (first side-surface protective parts) extending downward from both ends of the upper-surface protective part 23 in a width direction, and opposed to two crosswise side surfaces 14B (side surfaces), respectively, of the island-like end part 14 that face in the width direction; and two curling parts 25 extending from lower ends of the two crosswise surface protective parts 24, respectively, in such a manner that the two curling parts 25 get closer to each other as they extend. According to the above-described configuration, the protective metal fitting 6 is less likely to be squashed in the vertical direction, so that the island-like end part 14 can be effectively protected.

Note that although the socket connector 2 includes two protective metal fittings 6 in this embodiment, a configuration in which the socket connector 2 includes only one protective metal fitting 6 is also conceivable.

Further, the thickness direction of the two curling parts 25 is parallel to the vertical direction. According to the above-described configuration, when the upper-surface protective part 23 receives a load downward, the two curling parts 25 can reliably receive this load.

Further, the two curling parts 25 are exposed downward. According to the above-described configuration, a configuration in which the two curling parts 25 are directly opposed to the socket side board is realized.

Further, as shown in FIG. 9, each of the curling parts 25 is asymmetrical with respect to the second bisecting line C2 (the bisecting line) that extends in the width direction and bisects each of the curling parts 25 in the pitch direction. The shapes of the tips of the two curling parts 25 are complementary to each other. According to the above-described configuration, it is possible to secure a large maximum size of each of the curling parts 25 in the width direction, and to solve a backlash problem which would otherwise occur when the C-shaped protective part 20 is formed is solved. Note that since the maximum size of each of the curling parts 25 in the width direction contributes to shortening the distance D1 shown in FIG. 18, the protective metal fitting 6 becomes less likely to be squashed in the vertical direction even further.

Further, as shown in FIGS. 6 to 8, the protective metal fitting 6 further include: a lengthwise protective part 21 (a second side-surface protective part) extending downward from an end part of the upper-surface protective part 23 in a pitch direction, and opposed to a lengthwise side surface 14C (a side surface) of the island-like end part 14 that faces in the pitch direction; and a connection part 22 extending outward in the pitch direction from a lower end of the lengthwise protective part 21, and as shown in FIG. 12, exposed outward in the pitch direction from the socket housing 5. Further, the connection part 22 is formed so as to branch off in the width direction and outward in the pitch direction. According to the above-described configuration, it is possible to secure a sufficient clearance between the protective metal fitting 6 and the socket auxiliary metal fitting 7.

Note that the above-described embodiment can be modified, for example, as described below.

That is, although the protective metal fitting 6 and the socket auxiliary metal fitting 7 are separate components in the above-described embodiment, the protective metal fitting 6 and the socket auxiliary metal fitting 7 may instead be formed as one component.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A socket connector comprising:
a housing in which an island-like part and a peripheral wall surrounding the island-like part project upward from a bottom plate;
a plurality of contacts arranged in the housing; and
a protective metal fitting configured to protect an island-like end part, the island-like end part being an end part of the island-like part in a pitch direction, the pitch direction being a direction in which the plurality of contacts are arranged, wherein
the protective metal fitting comprises:
an upper-surface protective part covering an upper surface of the island-like end part;
two first side-surface protective parts extending downward from both ends of the upper-surface protective part in a width direction, the width direction being perpendicular to the pitch direction, and opposed to both side surfaces, respectively, of the island-like end part that face in the width direction; and
two curling parts extending from lower ends of the two first side-surface protective parts, respectively, in such a manner that the two curling parts get closer to each other as they extend straight along the width direction,
the two curling parts extend straight along the width direction thereby a thickness direction of the two curling parts is parallel to a vertical direction.

2. The socket connector according to claim 1, wherein the two curling parts are exposed downward.

3. The socket connector according to claim 1, wherein
each of the curling parts is asymmetrical with respect to a bisecting line, the bisecting line extending in the width direction and bisecting each of the curling parts in the pitch direction, and
shapes of tips of the two curling parts are complementary to each other.

4. The socket connector according to claim 1, wherein
the protective metal fitting further comprises:
a second side-surface protective part extending downward from an end part of the upper-surface protective part in the pitch direction, and opposed to a side surface of the island-like end part that faces in the pitch direction; and
a connection part extending outward in the pitch direction from a lower end of the second side-surface protective part, and exposed outward in the pitch direction from the housing.

5. The socket connector according to claim 1, wherein the connection part branches off in the width direction while extending outward in the pitch direction.

6. A socket connector comprising:
a housing in which an island-like part and a peripheral wall surrounding the island-like part project upward from a bottom plate;
a plurality of contacts arranged in the housing; and
a protective metal fitting configured to protect an island-like end part, the island-like end part being an end part of the island-like part in a pitch direction, the pitch direction being a direction in which the plurality of contacts are arranged, wherein
the protective metal fitting comprises:
an upper-surface protective part covering an upper surface of the island-like end part;
two first side-surface protective parts extending downward from both ends of the upper-surface protective part in a width direction, the width direction being perpendicular to the pitch direction, and opposed to both side surfaces, respectively, of the island-like end part that face in the width direction; and two curling parts extending from lower ends of the two first side-surface protective parts, respectively, in such a manner that the two curling parts get closer to each other as they extend, wherein each of the curling parts is asymmetrical with respect to a bisecting line, the bisecting line extending in the width direction and bisecting each of the curling parts in the pitch direction, and shapes of tips of the two curling parts are complementary to each other.

* * * * *